United States Patent
Ghasripoor et al.

(10) Patent No.: US 6,457,939 B2
(45) Date of Patent: Oct. 1, 2002

(54) PROFILED SURFACE USED AS AN ABRADABLE IN FLOW MACHINES

(75) Inventors: Farshad Ghasripoor, Scotia, NY (US); Eduard Müller, Winterthur (CH)

(73) Assignee: Sulzer Metco AG, Wohlen (CH)

( * ) Notice: Subject to any disclaimer, the term of this patent is extended or adjusted under 35 U.S.C. 154(b) by 0 days.

(21) Appl. No.: 09/742,169

(22) Filed: Dec. 19, 2000

(30) Foreign Application Priority Data

Dec. 20, 1999  (EP) ............................................ 99811170

(51) Int. Cl.$^7$ ................................................ B63H 1/00
(52) U.S. Cl. .................... 415/174.4; 29/889.2; 428/116; 427/446
(58) Field of Search .............................. 415/173.4, 200, 415/9; 29/889.2; 428/116, 167, 169; 427/446

(56) References Cited

U.S. PATENT DOCUMENTS

| | | | |
|---|---|---|---|
| 3,042,365 A | | 7/1962 | Curtis |
| 3,053,694 A | | 9/1962 | Daunt |
| 3,867,061 A | * | 2/1975 | Moskowitz ................ 415/174 |
| 3,916,054 A | * | 10/1975 | Long et al. .................. 428/117 |
| 4,289,447 A | * | 9/1981 | Sterman et al. ............. 415/200 |
| 4,346,904 A | * | 8/1982 | Watkins, Jr. ................. 277/236 |
| 4,405,284 A | * | 9/1983 | Albrecht et al. ............ 415/174 |
| 4,416,457 A | * | 11/1983 | McGinnis et al. ............ 277/53 |
| 4,594,053 A | | 6/1986 | Soehngen |
| 4,623,298 A | * | 11/1986 | Hallinger et al. ........... 415/139 |
| 4,867,639 A | | 9/1989 | Strangman |
| 5,064,727 A | | 11/1991 | Naik |
| 5,485,723 A | * | 1/1996 | McCoy et al. ............. 60/226.1 |
| 5,951,892 A | | 9/1999 | Wolfla |

FOREIGN PATENT DOCUMENTS

EP    0935009 A1    8/1999

* cited by examiner

Primary Examiner—Edward K. Look
Assistant Examiner—James M McAleenan
(74) Attorney, Agent, or Firm—Townsend and Townsend and Crew LLP

(57) ABSTRACT

The profiled surface is used as an abradable (1) in flow machines such as gas turbines where blade tips (2) move over the profiled abradable in a predetermined direction (v) to produce a partial abraded surface which is formed by material removal or ablation. The surface is formed by ribs (15) which surround chamber-like depressions (11) and extend in rib directions. The abradable (1) forms a pattern of strip-like elements (5) which lie in the directions of the ribs on connection lines (45) between corner points (41, 42; 43, 44) of a reference grid (40). Over at least more than 80–90% of the abraded surface the rib direction differs from the direction of movement (v) of the blade tips (2). For at least two-thirds of the abraded surface the direction of movement deviates from the rib direction by more than 30°, preferably more than 45°. The strip-like elements (5) of the abraded surface can be curved as well as discrete and/or partly connected strips.

23 Claims, 5 Drawing Sheets

PROFILED SURFACE USED AS AN ABRADABLE IN FLOW MACHINES

BACKGROUND OF THE INVENTION

The invention relates to a profiled surface which is used as an abradable in flow machines and to a flow machine with an abradable of this kind. The profiled surface which is used as an abradable will be named an abradable for short in the following.

In flow machines such as airplane propulsion units, stationary gas turbines, turbocompressors and pumps it is necessary for a high efficiency that at the periphery of a rotor carrying rotor blades a sealing gap between the blade tips and the housing be very narrow during operation. With the use of abradables on the inner surface of the housing over which the tips of the rotor blades move, it is possible to produce minimum sealing gaps without the blade tips thereby being damaged. For high operating temperatures, which lie above about 800° C., the abradables must be manufactured with a ceramic material, which is applied by means of thermal spraying methods, flame spraying or atmospheric plasma spraying. Through the admixing of a phase which can be burned out (polymer powder) to a ceramic spraying powder, a porosity of the abradable can be achieved thanks to which fine particles can be released from the surface of the abradable by the blade tips of the rotating rotor.

In ceramic abradables with a non-profiled surface the blade tips must usually be armored, for example through laser re-melting with the simultaneous addition of hard particles to prevent damage during the abrasion. Released abrasion particles must be able to escape from the sealing gap without substantial resistance. An abradable with a profiled surface is known from EP-A- 0 935 009. It was expected from the latter that abrasion particles could escape without problems from the sealing gap and that an armoring of the blade tips could be dispensed with. Tests showed however that material was abraded at the non-armored blade tips during the abrasion in a manner which led to a corrugated edge of the blade tips. A material ablation of this kind at the blade tips cannot be tolerated.

SUMMARY OF THE INVENTION

It is therefore an object of the invention to create an abradable which has an abradable surface and is suitable for non-armored blade tips. Profiled surfaces are formed by the blade tips as they remove abradable material.

The profiled surface is used in flow machines. In these machines blade tips move over the profiled abradable in a predetermined direction. In so doing they produce a partial surface, an abraded surface, which is formed by the removal of material. The profiling of the surface is formed by ribs which surround chamber-like depressions. A rib direction can in each case be associated with the ribs. The abraded surface forms a pattern which is built up of strip-like elements and the elements of which lie in the directions of the ribs on connection lines between corner points of a reference grid. Largely at each location of the abraded surface—i.e. at least at 80% to 95% of the abraded surface—the rib direction differs from the direction of movement of the blade tips. For at least two-thirds of the abraded surface the direction of movement deviates from the rib direction by more than 30°, preferably more than 45°. The strip-like elements of the abraded surface can be curved as well as discrete and/or partly connected strips.

Thanks to the design of the profiling of the abradable in accordance with the invention, which is carried out taking the direction of movement of the blade tips into account, less material is removed at the non-armored blade tips and, in addition, the material removed is uniformly distributed over the entire edge of a tip. In order to reduce the material removal at the blade tips still further, the blade tips can also be armored.

The invention will be explained in the following with reference to the drawings.

DESCRIPTION OF THE PREFERRED EMBODIMENTS

Figure 1:
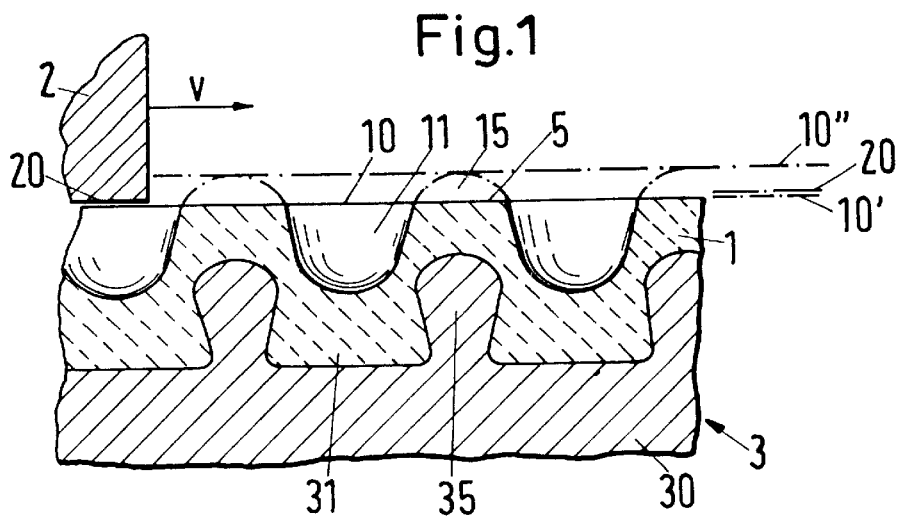
FIG. 1 is a cross-section through an abradable with a blade tip running over an abraded surface.
Figure 2:
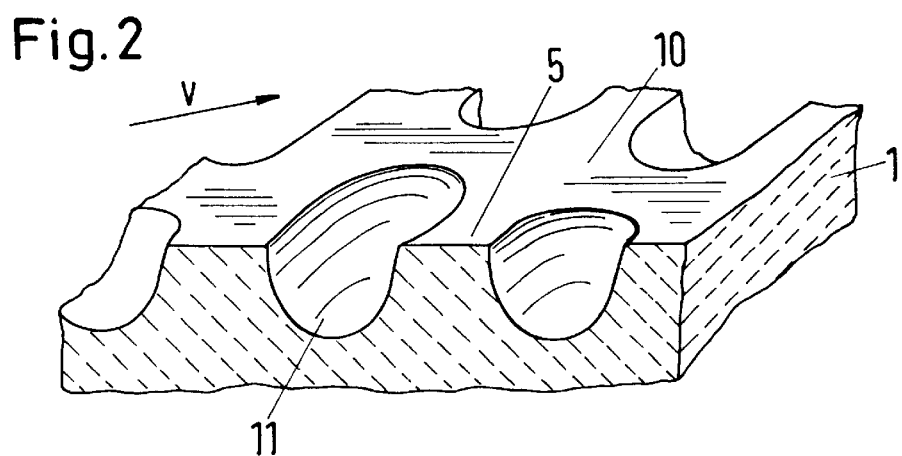
FIG. 2 is a perspective view of the abradable.

The abradable 1 which is illustrated in FIG. 1 as a cross-section has a profiled surface, over which a blade tip 2 moves in a plane 20 in a predetermined direction v. Ribs 15 form the profiling of the surface; they surround chamber-like depressions 11. An original surface 10" of the abradable 1 is indicated in chain-dotted lines. An abraded surface 10 in a plane 10' has been formed by the blade tip 2 through material removal or ablation. A narrow gap between the plane 20 and the abraded surface 10 is a sealing gap which is produced by the material ablation. The abraded surface 10 forms a pattern which can be imagined as being built up of strip-like elements 5. The abradable 1 with the abraded surface 10 and depressions 11 is illustrated in an oblique view in FIG. 2. The following FIGS. 3 to 12 show diverse patterns of the abraded surface 10, such as result through material removal of the abradables 1 in accordance with the invention. The strip-like elements 5 of the abraded surface 10 can be curved; they can also be present as discrete and/or as partly connected strips.

The abradable 1 is applied to a metallic substrate 3 through thermal spraying, with a material being used which for example contains ceramic material for use at high temperatures and which can already be known for the use in non-profiled abradables (see e.g. U.S. Pat. No. 5,434,210). The substrate 3 has a profiled surface with webs 35. This profiling can be present in different forms: as a cast profiling of a cast body; as a profiling which is produced on an originally flat metallic body by means of countersink erosion or by means of a mechanical cutting process; as a profiling of woven or individual metallic wires which are applied to a metallic body through soldering or by means of a laser welding or diffusion welding; or as a profiling in the form of ribs which are applied in a micro-casting manner through a laser application welding.

In order that a build-up of ribs 15 is possible in the thermal spraying onto the webs 35, it must be provided that the widths of the strip-like elements 5 are greater than about 1 mm. In order that no damage arises in the ablation of material from the abradable 1, these widths must be on the same order of magnitude as the cross-sectional width of the blade tip (width in the direction of travel v); they should not exceed one to three times this cross-sectional width.

The webs 35 have cross-sections which narrow in the direction towards a rump 30 of the substrate 3. They can also form gaps to the rump 30, as is known from the above named EP-A- 0 935 009. As a result of this shaping the material which forms the abradable 1 is anchored in depressions 31 between the webs 35.

A rib direction can be associated in each case with the ribs 15. In accordance with the invention the rib direction must differ largely or appreciably at each location of the abraded surface 10 from the direction of movement v of the blade tip 2. In this, the terms "largely" and "appreciably" are to be understood to mean that a like orientation of the blade movement and the ribs is present for at most 5–15% or 20% of the abraded surface 10. To which extent these orientations can be the same must be determined empirically. For at least two-thirds of the abraded surface 10 the direction of movement v must deviate in accordance with the invention from the rib direction by more than 30°, preferably more than 45°. If these conditions are met, then a non-armored blade tip 2 can be used.

Figure 3:
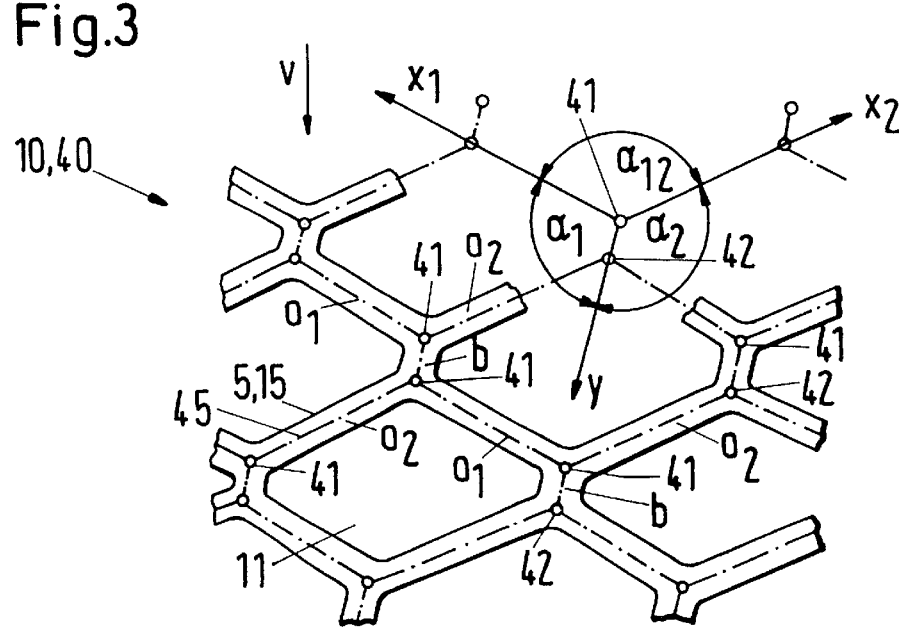
FIG. 3 shows a first pattern of the abraded surface of an abradable obtained in accordance with the invention.

In FIG. 3 a first pattern of the abraded surface 10 of an abradable 1 in accordance with the invention is shown. The pattern is built up of the strip-like elements 5. These elements 5 lie in the directions of the ribs 15 on connection lines 45 between corner points 41, 42 of a reference grid 40. Three axes $x_1$, $x_2$, y can be associated with each corner point 41 or 42 of the reference grid 40. Angles $\alpha_{12}$, $\alpha_2$ and $\alpha_1$ respectively are subtended between these axes. Ribs 15, which are designated by $a_1$, $a_2$, b lie on the axes $x_1$, $x_2$ and y respectively. The ribs $a_1$ and $a_2$ are longer than the rib b by a factor of 2 or more. The angles $\alpha_1$, $\alpha_2$, $\alpha_{12}$ are in each case greater than 100° and less than 150° (total sum 360°). The pattern shown has a generalized honeycombed structure: connection lines 45 between in each case six corner points of the reference grid 40, namely three corner points 41 and three corner points 42, can be associated with the ribs 15 of the chamber-like depressions 11.

Each axis y is at least approximately parallel to a single y-direction. The direction of movement v of the blade tip 2 deviates from the y-direction by a small angle, which is 30° at the most. The rib b is preferably much smaller in comparison with the ribs $a_1$, $a_2$, namely by a factor which is greater than 3. The corner points 41 and 42 which are associated with the rib b can be so close to one another that the rib b is practically negligible, i.e. does not exist.

Figure 4:
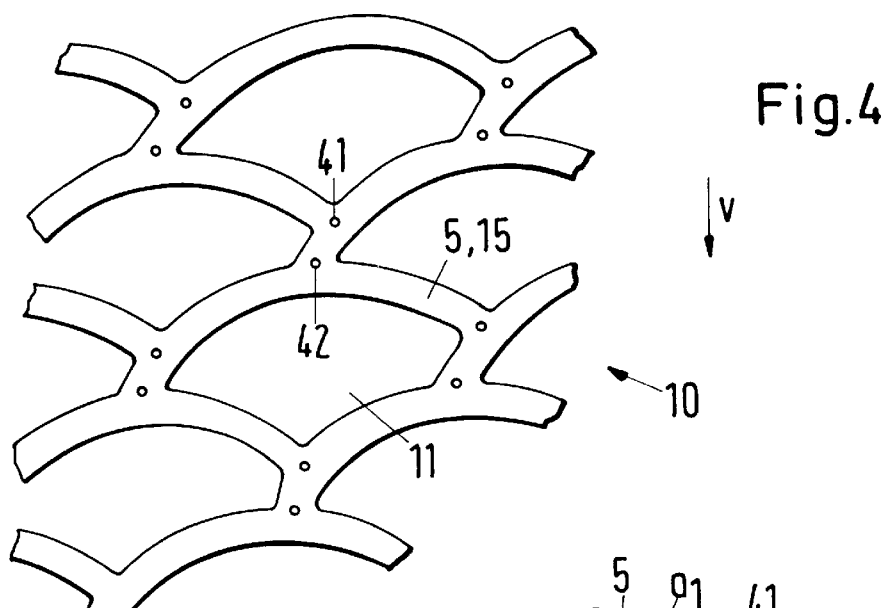
FIGS. 4, 5 show modifications of the first pattern of the abraded surface.
Figure 5:
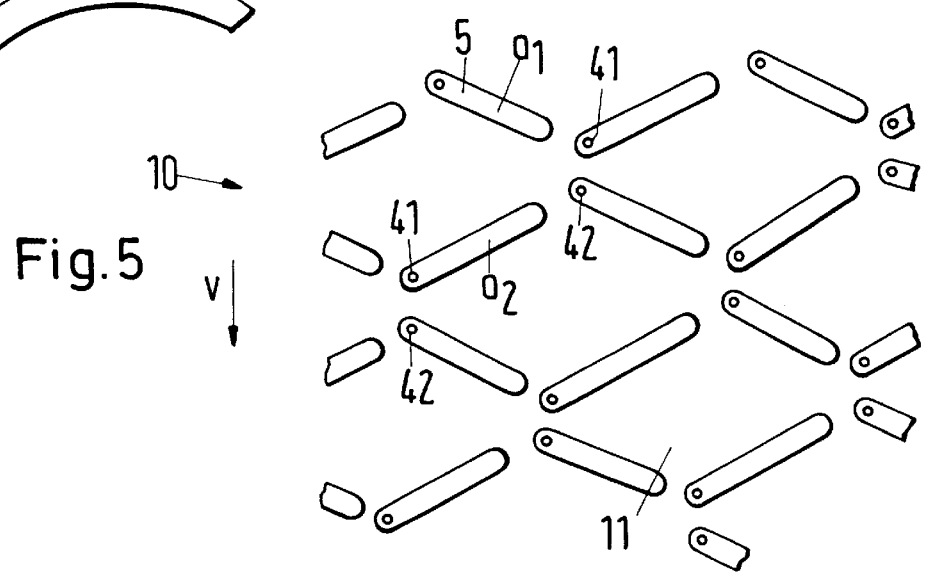
Figure 6:
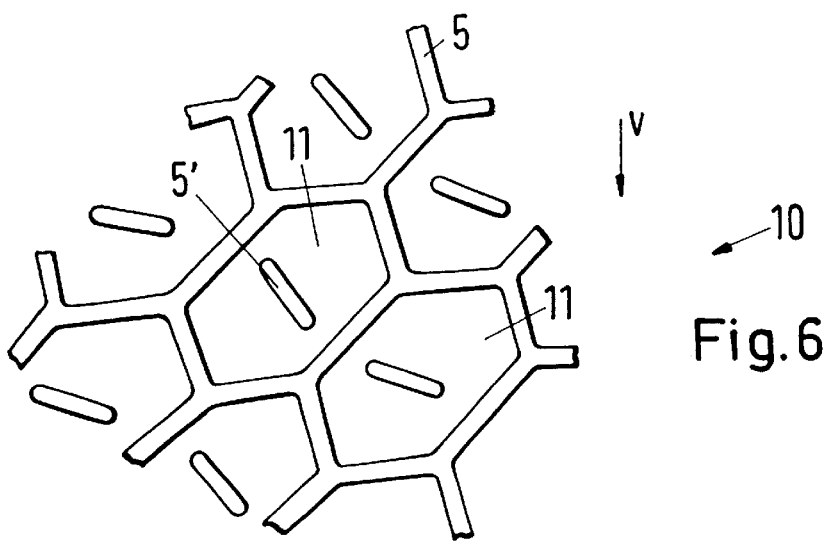
FIGS. 6–10 are patterns of further abraded surfaces obtained in accordance with the invention.

FIGS. 4 and 5 show modifications of the first pattern (FIG. 3). In FIG. 4 the pattern has a structure which resembles a covering with fish scales. The ribs 15 are curved. In FIG. 5 the pattern is composed of discrete elements 5. Only ribs $a_1$ and $a_2$ are present; instead of the ribs b there are gaps.

Figure 7:
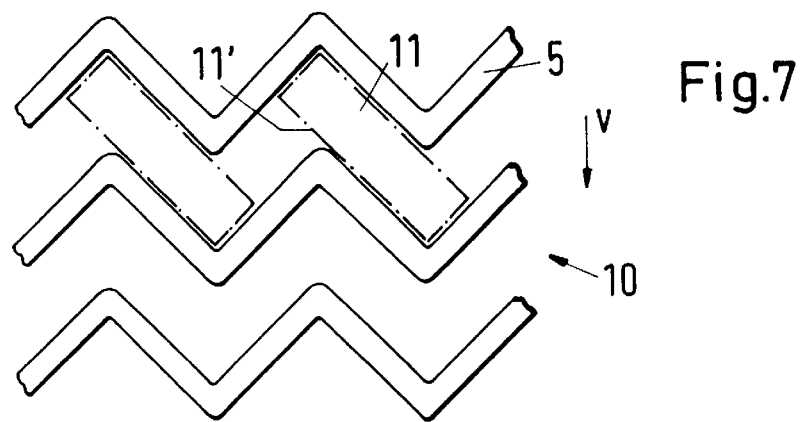
Figure 8:
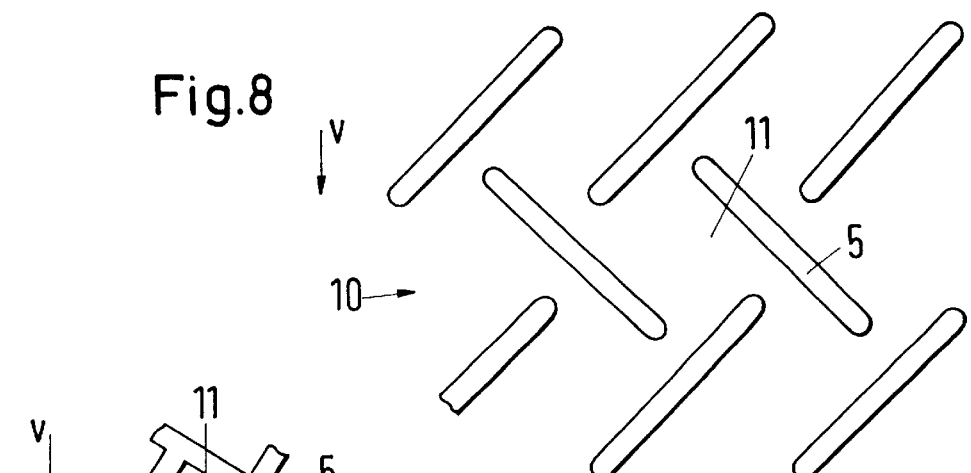
Figure 9:
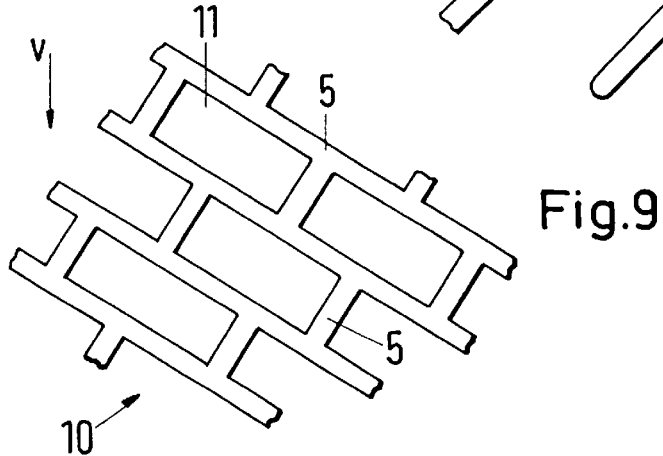
Figure 10:
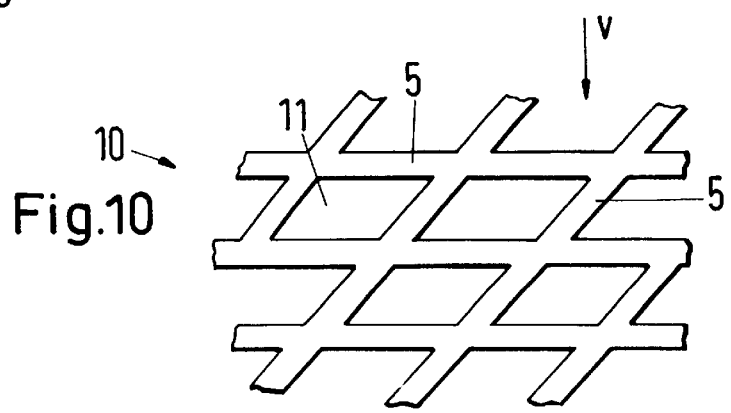
Figure 11:
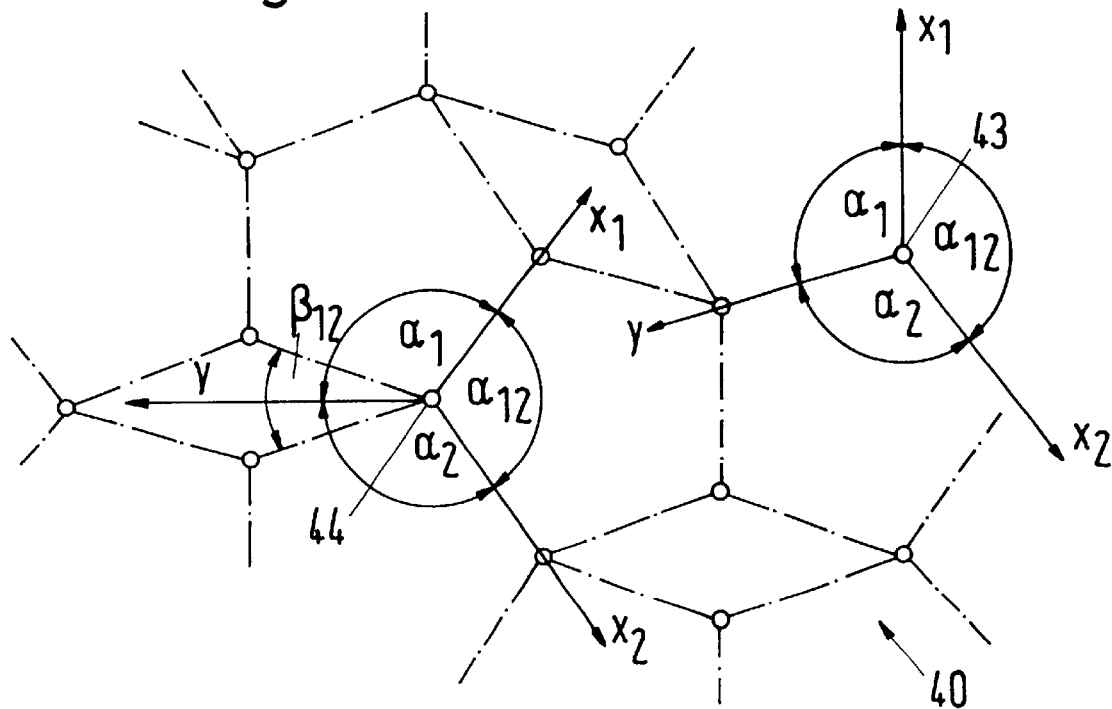
FIG. 11 shows a reference grid with a "Penrose" structure comprising equilateral pentagons and rhombi.

FIG. 6 again shows a pattern of the abraded surface 10 which is honeycomb-like. Elements 5' are arranged like islands in the individual depressions 11. In FIG. 7 the strip-like elements 5 are arranged connectedly on zigzag lines. The angle between the rib directions and the direction of movement v is preferably 45° or else somewhat greater. The boundaries of the chamber-like depressions 11 cannot be given here uniquely; they can for example be considered to be the rectangles 11' which are drawn in chain-dotted lines. FIG. 8 again shows a pattern with discrete elements 5, as does FIG. 5. This pattern has a certain relationship with the zigzag pattern of FIG. 7 in that in this pattern every other element 5 of the zigzag pattern is removed and the remaining elements 5 are each prolonged at both ends. FIG. 9 shows a pattern with depressions 11 which are rectangular and are arranged to be displaced with respect to one another. A rhombic pattern is illustrated in FIG. 10 in which the one rib direction is perpendicular to the direction of movement v and the other rib direction subtends an angle of about 45° with the direction of movement v.

Figure 12:
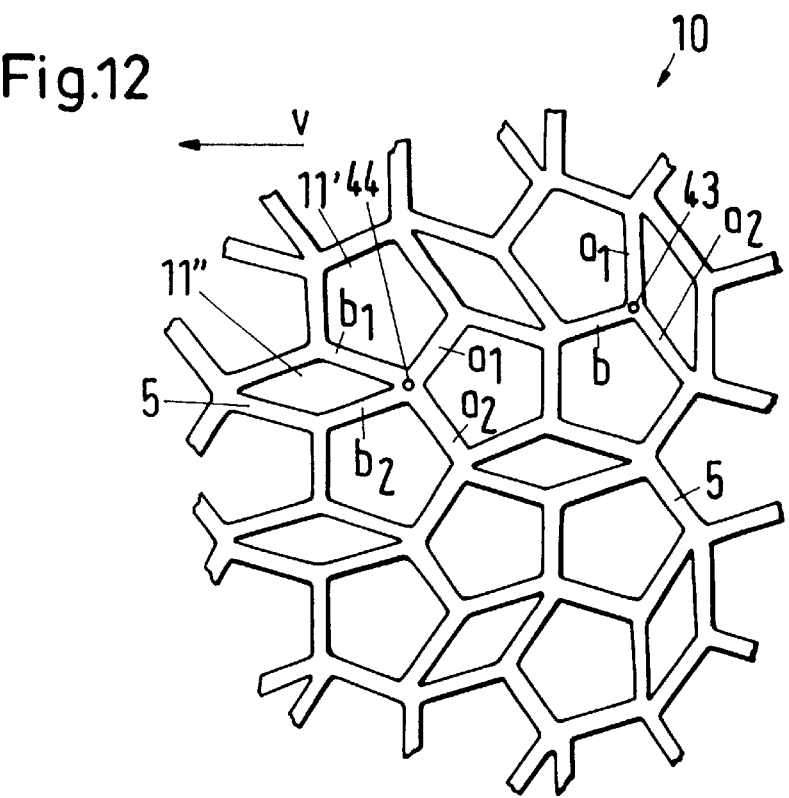
FIG. 12 shows a corresponding pattern of an abraded surface.

In the exemplary embodiments of FIGS. 3 to 10 the abraded surfaces 10 have in each case a profiling which defines the reference grid 40 and is formed by periodically arranged elementary cells (hexagons or squares). A non-periodic profiling is also possible, the reference grid 40 of which for example has a "Penrose structure" in accordance with FIG. 11. FIG. 12 shows a corresponding pattern of an abraded surface 10 with depressions 11' and 11" which are pentagonal or rhomboidal. This reference grid 40 comprises equilateral pentagons (angles between adjacent sides: 108°) and rhombi (angle: 36° and 144°). Whereas in the periodic grids two or three main directions are present, there are five main directions in the "Penrose structure". The direction of movement v of the blade tips 2 advantageously deviates from one of these main directions by about 18°.

For a reference grid 40 which at least approximately has a "Penrose structure", the following statements hold (cf. FIGS. 11, 12): Three axes $x_1$, $x_2$, y can be associated with each corner point 43 or 44 of the reference grid 40. Angles $\alpha_{12}$, $\alpha_2$ and $\alpha_1$ respectively are subtended between these axes. Ribs $a_1$, $a_2$ lie on the axes $x_1$, $x_2$. The ribs $a_1$ and $a_2$ are largely equally long. The angles $\alpha_1$, $\alpha_2$, $\alpha_{12}$ are in each case greater than 100° and less than 150° (total sum 360°). For one portion of the corner points, namely the corner points 43, one rib b lies on the axis y. For the further corner points 44 a branching about the axis y with two ribs $b_1$, $b_2$ is given in each case. The ribs b and, respectively, $b_1$ and $b_2$ are largely of length equal to that of $a_1$ or $a_2$. An angle $\beta_{12}$ between $b_1$ and $b_2$ is greater than 30° and less than 45°. The direction of movement v of the blade tip 2 is substantially parallel to the axis y of one of the branchings.

The above-described abradables can also be applied to a movable machine part instead of to a housing wall, namely when the blade is stationarily arranged, in particular is a rotor blade, and the sealing gap is located between the blade tip at rest and the moved machine part, with the machine part being in particular a rotor shaft. Abradables can also be applied to shrouded blades at the tips of stationary blades. The movement of the blade tip is therefore to be understood to constitute a relative movement.

Figure 13:
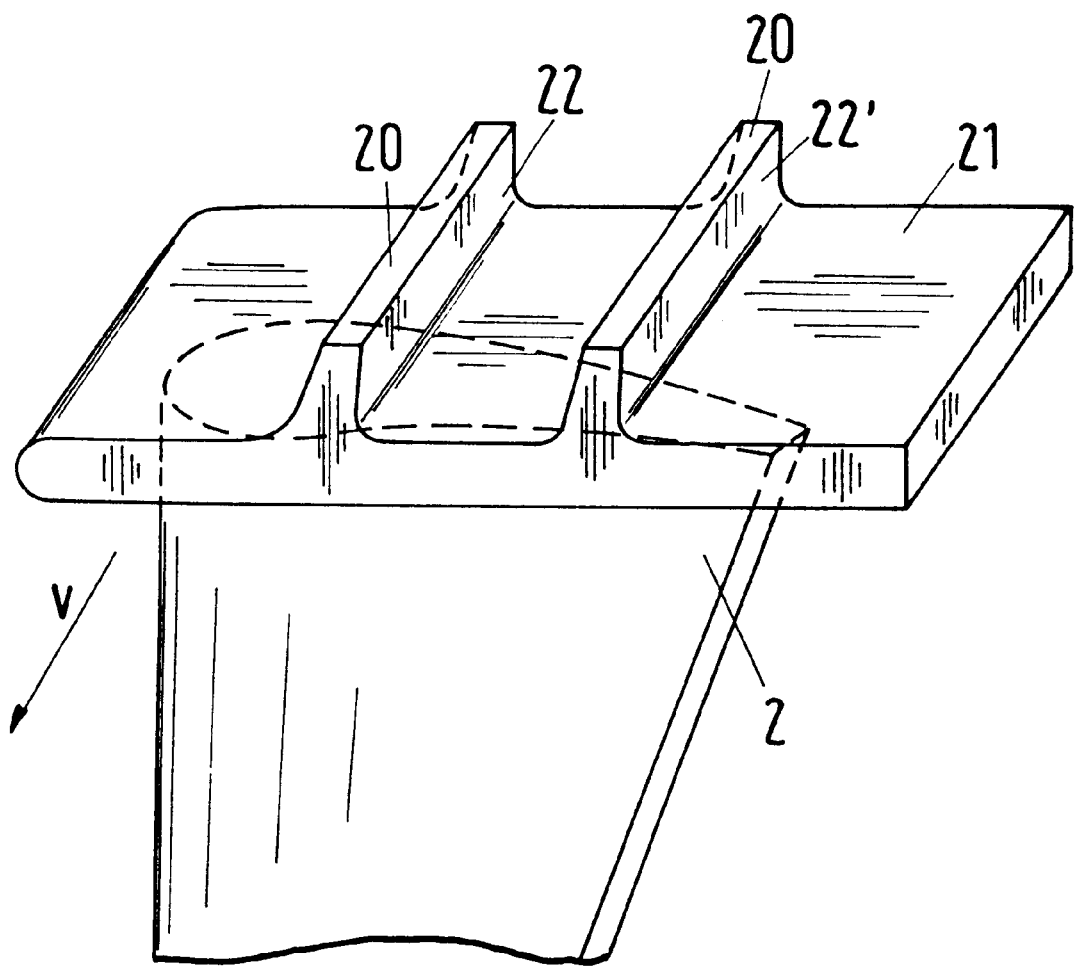
FIG. 13 shows a blade tip with a shrouded blade.

A flow machine with an abradable 1 in accordance with the invention can also contain blades of which the tips 2 are in each case formed as a shrouded blade 21: see FIG. 13. The shrouded blade 21 has one or more lamella 22, 22' which extend in the direction of movement v of the blade tip 2. When a plurality are present the lamella 22, 22' form a labyrinth seal.

What is claimed is:

1. A profiled surface for use as an abradable in flow machines having blade tips that move in a predetermined direction, the abradable comprising a profiled member including a multiplicity of ribs, each rib extending in a rib direction, the moving blade tips partially removing the abradable to form a partial abraded surface defined by abraded surface strips which extend in the directions of the ribs, the ribs being formed along connection lines between corner points of a reference grid, at least 80% of the abraded surface strips extending in rib directions which differ from the predetermined blade tip movement direction, at least two-thirds of the connection lines and therewith at least two-thirds of the abraded surface strips deviating from the predetermined blade tip movement direction by more than 30°, and wherein ends of the abraded surface strips are one of contiguous with each other and spaced apart from each other.

2. A profiled surface according to claim 1 wherein ribs extend from each corner point along first, second and third axes, wherein the first, second and third axes are subtended by angles greater than 100° and less than 150°, wherein the first axis extends in a direction which differs from the predetermined blade tip movement direction by no more than 30°, and wherein the ribs extending along the second and third axes are at least twice as long as the ribs extending in the direction of the first axis.

3. A profiled surface according to claim 2 wherein the ribs form a multiplicity of contiguous rib structures extending between six corner points of the reference grid.

4. A profiled surface according to claim 2 wherein the length of the second and third ribs is at least three times greater than the length of the first rib.

5. A profiled surface according to claim 2 wherein the length of the first rib is negligible as compared to the lengths of the second and third ribs.

6. A profiled surface according to claim 1 wherein ribs extend from each corner point along first and second axes subtended by angles greater than 100° and less than 150°, and wherein a gap extends along a third axis between some corner points and subtended relative to the first and second axes by angles which are greater than 100° and less than 150°, the third axis extending in a direction which differs from the predetermined blade tip movement direction by no more than 30°, and wherein the ribs extending along the first and second axes are at least twice as long as the third axis.

7. A profiled surface in accordance with claim 2 wherein the grid includes first and second, spaced-apart corner points, and ribs extend from each corner point in first, second and third directions which are angularly inclined relative to each other by angles in a range between 100° and 150°, the first direction being substantially parallel to the predetermined blade tip movement direction, the ribs extending along the second and third axes being of approximately equal length, the first rib extending from the first corner point extending in the first direction, the first rib extending from the second corner point being defined by two ribs divergingly extending from the second corner point and defining an angle between them which is greater than 30° and less than 45°, and the first, second and third ribs being of substantially equal length.

8. A profiled surface according to claim 1 wherein the abraded surface strips have a width greater than about 1 mm and less than three times a cross-sectional width of the blade tip.

9. A profiled surface according to claim 1 including a metallic substrate which has webs that coincide with the ribs of the abradable, wherein the abradable comprises a ceramic material, and wherein the abradable is thermally sprayed onto the substrate so that the ribs are defined by portions of the abradable sprayed onto the webs.

10. A flow machine comprising blade tips that move in a predetermined direction and an abradable facing the blade tips and comprising a profiled member including a multiplicity of ribs, each rib extending in a rib direction, the moving blade tips partially removing the abradable to form a partial abraded surface defined by abraded surface strips which extend in the directions of the ribs, the ribs being formed along connection lines between corner points of a reference grid, at least 80% of the abraded surface strips extending in rib directions which differ from the predetermined blade tip movement direction, at least two-thirds of the connection lines and therewith at least two-thirds of the abraded surface strips deviating from the predetermined blade tip movement direction by more than 30°, and wherein ends of the abraded surface strips are one of contiguous with each other and spaced apart from each other.

11. A flow machine according to claim 10 comprising a gas turbine.

12. A flow machine according to claim 10 wherein the blade comprises a rotor blade.

13. A flow machine according to claim 10 wherein the blade tip comprises a shrouded blade including at least one lamella extending in the predetermined direction of blade movement and forming sealing lips for a labyrinth seal.

14. A flow machine according to claim 10 comprising a stationary housing and a moving machine part, wherein the blade tip is part of a stationary guide blade attached to the housing and forms a sealing gap between the blade tip and the moving machine part, and wherein the abradable is attached to one of a shrouded blade at the tip of the stationary blade and a surface of the moving machine part.

15. A flow machine according to claim 14 wherein the movable machine part comprises a rotor shaft.

16. A profiled surface for use as an abradable in flow machines having rotating blades which end in blade tips that move in a predetermined direction, the profiled surface including a multitude of ribs distributed over the surface and extending in rib directions, the movement of the blade tips removing some of the abradable material from the ribs to thereby form an abraded surface defined by abraded surface strips, at least 80% of the abraded surface strips extending in rib directions which differ from the predetermined movement direction of the blade tips.

17. A profiled surface according to claim 16 wherein more than 90% of the abraded surface strips extend in rib directions which differ from the predetermined movement direction of the blade tip.

18. A profiled surface according to claim 16 wherein the abraded surface strips are longitudinally curved.

19. A profiled surface according to claim 16 wherein the abraded surface strips are at least partly connected.

20. A profiled surface according to claim 16 wherein the abraded surface strips are separated from each other.

21. A profiled surface according to claim 16 wherein the abraded surface strips have a width greater than about 1 mm.

22. A profiled surface according to claim 21 wherein the width of the abraded surface strips is less than one to three times a cross-sectional width of the blade tip.

23. A profiled surface according to claim 16 including a metallic substrate which has webs that coincide with the ribs of the abradable, wherein the abradable comprises a ceramic material, and wherein the abradable is thermally sprayed onto the substrate so that the ribs are defined by portions of the abradable sprayed onto the webs.

* * * * *